United States Patent Office 2,809,193
Patented Oct. 8, 1957

2,809,193

PROCESS FOR TREATING CELLULOSE ESTERS

William D. Stewart, Falls Church, and Gerald L. Gatcomb, Alexandria, Va., assignors to Atlantic Research Corporation, Alexandria, Va., a corporation of Virginia No Drawing. Application June 21, 1954, Serial No. 438,348

29 Claims. (Cl. 260—230)

This invention relates to a new and improved process for preparing fatty acid esters of cellulose in the form of small, spherical particles of high density.

A method for making particles of fatty acid esters of cellulose having the desired characteristics is described in the co-pending application of Arthur W. Sloan and David J. Mann, Serial Number 432,322, filed May 25, 1954. The process herein described possesses the advantages, as compared with the Sloan and Mann process, of greater simplicity, reduced cost and the elimination of the numerous washings of the particles required to remove the coating of protective colloid.

The object of this invention is to provide a method for making small, spherical, non-porous particles of cellulose acetate and other fatty acid cellulose esters which requires the addition of a minimum of readily removable treating agent.

Broadly speaking, the invention comprises dissolving the fatty acid cellulose ester in a suitable solvent to form a lacquer, dispersing the lacquer in an aqueous vehicle in the presence of a suitable emulsifying agent under vigorous agitation, removing the solvent from the dispersed cellulose ester particles while suspended in the water and then separating, washing and drying the cellulose ester particles.

The cellulose esters are preferably the lower fatty acid derivatives such as cellulose acetate, cellulose propionate, cellulose butyrate and the like. The acylating groups may be the same or mixed. In general, cellulose acetate or mixed esters of cellulose acetate containing other lower fatty acid esterifying groups, such as cellulose acetate propionate, cellulose acetate butyrate and cellulose acetate sorbate, are preferred.

The cellulose ester solvent, to be suitable for our purpose, must be characterized by certain essential properties. It must be a good solvent for the cellulose ester. This includes solvents which are good solvents per se or co-solvent mixtures which perform as good solvents although one or all of the components may individually have poor solvent properties. Preferably the solvent is a mixture of co-solvents, one component of which is insoluble to moderately soluble in water, preferably moderately soluble, and another component of which is infinitely soluble. The term "moderately soluble" as employed in this specification and claims refers to a solvent which dissolves to the extent of at least about 5 parts in 100 parts of water at 20° C. and has a maximum solubility of about 50 parts, preferably about 30, in 100 parts of water at 20° C. In some cases, a good solvent for the cellulose ester such as methyl acetate, which is moderately soluble in water, may be employed without addition of an infinitely soluble co-solvent but, in general, superior results are obtained when it is combined with an infinitely soluble co-solvent.

Examples of moderately water soluble organic solvents which may be used include methyl acetate, ethyl acetate, methyl formate, ethyl formate, methyl ethyl ketone and nitromethane. The substantially insoluble chlorinated solvents such as chloroform, methylene chloride and ethylene dichloride are also utilizable but are among the less desirable solvents since the particles obtained tend to range in size close to or at the upper limit of desirability.

Infinitely water-soluble co-solvents include the lower aliphatic alcohols such as methyl, ethyl and propyl alcohol, acetone, methyl lactate, ethyl lactate, dioxan-1,4. The co-solvent need not of itself be a good solvent for the cellulose ester so long as it has co-solvent properties in admixture with the other less water-soluble solvent component. The co-solvent should also serve to reduce viscosity of the lacquer mix. We have found the lower aliphatic alcohols, such as methanol and ethanol, and acetone, preferably the alcohols, particularly suitable for our purpose. Methanol and ethanol, though poor solvents per se, possess excellent co-solvent properties and reduce the lacquer viscosity markedly.

The cellulose ester solvent must be moderately soluble in water but not infinitely soluble. The water solubility should be sufficient so that when the lacquer particles are dispersed in water, the solvent at and adjacent to the surface dissolves with sufficient rapidity in the water to permit some hardening or setting of the particle surface and thus eliminates or markedly reduces the surface tackiness to the point where such surface tackiness will not cause agglomeration. On the other hand, elution of the solvent should not be so rapid that the surface sets into a hard non-plastic condition before surface tension forces can effectively shape the particles into the desired spherical form. Premature excessive hardening of the particle surface also causes porosity since the non-plastic surface does not permit adequate shrinkage to compensate for removal of solvent from the interior of the particle. With a cellulose ester solvent of excessive water solubility, porosity may also be caused by migration of water into the particle because of the mutual solubilities of water and a highly water-soluble solvent. In general, the water solubility of the organic solvent should be within a range of about 5 to 50 parts per 100 parts of water at 20° C. and preferably about 10 to 40. Thus the maximum amount of infinitely soluble co-solvent which may be incorporated into the co-solvent mixture must not be greater than that which produces a mixed solvent water-solubility exceeding about 50.

Choice of the particular solvent to be employed is also determined to some extent by the method used in removing the solvent after particle formation. If the solvent is to be distilled, it should desirably have a relatively low boiling point. If the solvent is removed by elution, the least soluble solvent component should be moderately soluble to the extent that it can be fairly readily dissolved out of the particle by dilution of the aqueous dispersion with additional water.

The amount of solvent employed is to some extent determined by the particular solvent used. In general, we have found that lacquer solutions comprising about 5 to 20% cellulose ester, preferably about 10 to 15%, are best suited to our purpose. Proportions above 20% tend to be too highly viscous for ready dispersal in water to form small spherical particles. Solutions comprising less than about 5% may be used but tend to be uneconomical because of the large amount of solvent required.

The solvent systems which we have found to be particularly effective include methyl or ethyl acetate in combination with methanol, ethanol or acetone, preferably the alcohols because of their superior viscosity reducing properties. Ethyl acetate alone is a poor solvent for the cellulose esters but forms an excellent co-solvent system with the alcohols, which by themselves are also poor solvents. Optimum ratio of the infinitely water soluble component varies with the specific components employed and can readily be determined by the skilled practitioner in trial runs. In the case of the ethyl acetate-ethanol system the 80:20 ratio is particularly good, although somewhat higher or lower proportions of ethyl acetate may be used. For the methyl acetate-methanol system 78–86% methyl acetate to 22–14% methanol gives optimum results. Substantially similar ratios may be used with a methyl acetate-ethanol solvent system as with the methyl acetate-methanol system.

The cellulose ester lacquer is mixed with water containing a suitable emulsifying agent under continuous agitation to form a dispersion of fine lacquer particles with the water as the continuous phase. The emulsifying agent may alternatively be added to the lacquer. The dispersion and agitation may be accomplished by any suitable means, as for example, in a homogenizer or other suitable agitating device. The degree of agitation is one of the factors influencing particle size. In general, the more vigorous the agitation, the smaller are the particles.

The emulsifying agent is essential since it makes possible the fine comminution of the suspended particles and stabilizes the emulsion so that the surface of the particles have an opportunity to harden into a substantially non-tacky condition before agglomeration can occur. The emulsifying agent must be of the polar type which does not increase the viscosity of the water phase to any substantial degree and which functions primarily as a surface tension depressant as compared with the high molecular weight materials which function primarily as protective colloids. The emulsifying agent, furthermore, should be substantially water soluble or, in other words, should possess a sufficiently high hydrophile-lipophile balance to prevent its being drawn into the organic solvent and converting the emulsion into a water-in-oil system.

Examples of suitable polar type emulsifiers or dispersing agents include alkyl sulfates or sulfonates, alkyl aryl sulfonates, alkali metal soaps, alkali metal salts of perfluoro acids, alkali metal salts of sulfosuccinic acids, polyglycols such as polyethyleneglycol, sulfonated vegetable oils such as sulfonated castor oil and sulfonated coconut oil, sulfonated hydrocarbon oils such as sulfonated petroleum fractions, and the like. The sulfonated oils such as Turkey red oil and sulfonated petroleum oils are particularly satisfactory. However, any compatible surface active emulsifying agent may be employed to give satisfactory results.

The amount of emulsifier varies to some extent with the activity of the specific one used and with the particular solvent used in making the cellulose ester lacquer. The amount used should be sufficient to permit rapid comminution of the particles and the formation of the emulsion before excessive surface hardening of the particles into irregular shapes. In general a minimum of about 0.01% based on the water phase is required although this may vary, as aforementioned, depending upon specific circumstances. There is no critical upper limit with regard to the amount of emulsifying agent other than the fact that, in general, no advantage is obtained with amounts exceeding about 5 to 10% on the aqueous phase to warrant the increased cost. Amounts of emulsifier within the range of about 0.01 to 2% are usually adequate.

Particle size is a function of the lacquer/water ratio inasmuch as increasing the amount of water results in an increase in particle size. Thus the quantity of water used in emulsification is determined in some measure by the particle size desired. The minimum amount of water is governed by the lacquer/water ratio required to permit formation of the requisite oil-in-water system rather than a water-in-oil emulsion. If excessive water is employed, the particles tend to be oversize, irregular and porous, apparently because the organic solvent dissolves in the water phase with excessive rapidity so that the surface of the particles hardens into a non-plastic condition before adequate comminution or contraction into spheres. The optimum amount of water varies with the particular organic solvents used. In general, amounts ranging from about 50 to 125% by volume, and preferably about 50 to 100%, based on the volume of organic solvent, gives highly satisfactory results.

After emulsification of the lacquer is completed, the organic solvent must be removed from the dispersed lacquer particles. This may be accomplished by either of two methods. The solvent may be distilled off or eluted by dilution of the emulsion with additional water. During either process the dispersion should be maintained in a state of vigorous agitation.

Where distillation is employed, the temperature should desirably be maintained well below the boiling point of water, desirably at a maximum temperature of about 65° C., since higher temperatures tend to break the emulsion, thus causing agglomeration and consequent particle irregularity and oversize. Excessively high temperatures also cause removal of solvent from the surface of the particles at such a rapid rate that the surface sets and hardens to such an extent that surface plasticity is insufficient to compensate by contraction for removal of interior solvent and thus results in a porous particle. For optimum performance the temperature of the emulsion preferably should not exceed about 50° C. Thus, in some cases, it may be advisable to distill under vacuum.

An alternative method for removing the organic solvent comprises dissolving it out by the dilution of the emulsion with added water. We have found elution to be somewhat preferable to distillation because the former method eliminates any tendency to breaking of the emulsion.

The amount of water added to the emulsion for elution purposes is determined by several factors. It should be in sufficient amount to permit aqueous solution of substantially all of the organic solvent contained in the cellulose ester particles. This to a considerable degree is determined by the solvent/water ratio in the original emulsion and the water solubility of the specific organic solvent. The amount of water added is also a factor in the length of time required for elution. The larger the amount of water added, the shorter is the time required to remove the solvent. In general, we have found that dilution of the emulsion with about four volumes of water permits operation on a continuous basis. Dilution at this or a higher level removes the solvent from the particles at a sufficiently rapid rate and achieves sufficiently rapid hardening of the surface of the particles to permit continuous operation. Smaller amounts of water are also effective but generally require batch operation because of the slower elution rate.

After removal of the organic solvent, the particles are separated from the emulsion in any desired manner as by filtration, centrifuging and the like. The particles are then washed and dried. One washing is generally sufficient to remove the emulsifying agent from the surface of the particles.

The cellulose ester particles prepared according to our process are spherical and may be obtained in sizes as small as 1 micron or less in diameter. The particle size range is generally about 1 to 10 or 25 microns. This is the preferred size range. Depending upon the specific components and concentrations employed in the process, particle size may range up to about 100 microns. In general, products in which the average particle diameter is above about 50 microns are marginal. In other words, it is preferable that the size distribution of the particles by number be such that the maximum average size is about 50 microns.

Non-porosity of the particles is clearly demonstrated by their high density. In the case of cellulose acetate, for example, the average density is about 1.30 to 1.38 with a minimum of about 1.25. This compares very favorably with published figures of 1.27 to 1.35. The density of cellulose acetate sorbate averages about 1.3 and is the same as the published density of 1.3.

The small, non-porous, spherical particles of the fatty acid esters of cellulose may be employed in the manufacture of plastic objects and materials in any desired manner. They are especially useful, however, in that they can be suspended in a plasticizer to form homogeneous, stable, fluid slurries which may be poured as coatings or films without requiring the addition of water or a volatile solvent and may be molded into objects of any desired shape and size without the application of high temperatures and pressures. Such fluid, pourable cellulose ester plasticizer slurries are described in copending application by Arthur W. Sloan and David J. Mann, Serial Number 432,323, filed May 25, 1954.

EXAMPLE I 160 grams of cellulose acetate were dissolved in a mixed solvent comprising 1280 ml. ethyl acetate and 320 ml. ethanol. The lacquer was dispersed in 1200 ml. water containing 0.6 gram of a sodium salt of a perfluoro acid (Minnesota Mining Wetting Agent F–126) as the emulsifying agent under vigorous agitation in a homogenizer. Agitation was continued for about 5 minutes and then the emulsion was flooded with about 4 volumes of water with continued agitation to elute the organic mixed solvent from the dispersed lacquer particles. The particles were filtered, given one washing with water and dried. The resulting cellulose acetate particles were 1 to 2 micron spheres having a density of 1.35.

EXAMPLE II 120 grams of cellulose acetate were dissolved in a mixed solvent comprising 960 ml. ethyl acetate and 240 ml. ethanol. The lacquer was dispersed in 900 ml. water containing 0.9 gram Turkey red oil and 0.45 gram of an alkyl benzene sodium sulfonate (Ultrawet K) as emulsifiers under vigorous agitation in a homogenizer. Agitation was continued for about 5 minutes and then the emulsion was flooded with 4 volumes of water. The particles were filtered, water washed once and dried. The resulting cellulose acetate particles were 1 to 10 micron spheres having a density of 1.35.

EXAMPLE III 40 grams of cellulose acetate sorbate were dissolved in a mixed solvent consisting of 640 ml. ethyl acetate and 160 ml. ethanol. The lacquer was dispersed in 800 ml. water containing 6.4 grams Turkey red oil under vigorous agitation in a homogenizer. Agitation was continued about 5 minutes and then the solvent was removed from the lacquer particles by distillation under continued agitation at 17 to 28° C. and a pressure of 70–90 mm. The resulting cellulose acetate sorbate particles were 2–10 micron spheres having a density of 1.3.

EXAMPLE IV 30 grams of cellulose acetate sorbate were dissolved in a mixed solvent comprising 480 ml. ethyl acetate and 120 ml. ethanol. The lacquer was dispersed in 600 ml. water containing 4.8 grams Turkey red oil under vigorous agitation in a homogenizer. Agitation was continued about 5 minutes and then the solvent was removed from the lacquer particles by distillation under continued agitation at 14–28° C. and a pressure of 30 mm. The resulting cellulose acetate sorbate particles were 1–10 micron spheres having a density of 1.3.

Other examples illustrating our invention are summarized in Table I.

*Table I*

| Cellulose ester, grams | Solvent, ml. | Surface-active agent, grams | Water, ml. | Spherical Particle size, Microns |
|---|---|---|---|---|
| Cellulose acetate, 30 | Methyl acetate 99%, 200 | Polyethylene glycol, 15; Turkey red oil, 1.6. | 150 | 1–10 |
| Do | Methylene chloride 50%; Ethanol 50%, 200. | Turkey red oil, 3.2 | 200 | 2–35 |
| Do | Methyl acetate 75%; Methylene chloride 15%; Ethanol 10%, 200. | do | 200 | 2–35 |
| Do | do | Turkey red oil, 3.2; Phenol 1.0. | 200 | 2–35 |
| Do | Ethyl acetate 80%; Ethanol 20%, 200. | Turkey red oil, 3.2 | 250 | 1–20 |
| Do | do | Turkey red oil, 10.0 | 250 | 1–20 |
| Do | do | Alkyl aryl polyether alcohol, 0.1 (Triton X–100). | 250 | 1–20 |
| Do | do | Alkyl benzene sodium sulfonate, 0.1 (Ultrawet K). | 250 | 1–20 |
| Do | do | Modified phthalic Glycerol alkyd resin, 0.1 (Triton B–1956). | 250 | 1–15 |
| Do | do | Aryl ether of a polyglycol, 0.1 (Atlas G 1629C). | 250 | 1–15 |
| Do | do | Alkyl benzene sodium sulfonate (Ultrawet K), 0.075. | 120 | 1–20 |
| Do | do | do | 150 | 1–20 |
| Do | do | do | 175 | 1–20 |
| Do | Ethyl acetate, 160 ml.; Ethanol, 20 ml.; Methyl ethyl ketone, 40 ml. | Sodium salt of a perfluoro acid, 0.1 (Minnesota Mining F–126). | 250 | 1–10 |
| Do | Ethyl acetate, 180 ml.; Ethanol, 10 ml.; Acetone, 20 ml. | do | 250 | 1–10 |
| Cellulose acetate sorbate, 10. | Ethyl acetate, 160 ml.; Ethanol 40 ml. | Turkey red oil, 1.6 g | 200 | 1–10 |

Although this invention has been described with reference to illustrative embodiments thereof, it will be apparent to those skilled in the art that it may be embodied in other forms but within the scope of the appended claims.

We claim:

1. A process for making small, substantially non-porous, substantially spherical particles of lower fatty acid esters of cellulose which comprises dissolving up to about 20% of the cellulose ester in an organic solvent which is moderately soluble in water to the extent of about 10 to 50 parts in 100 parts of water at 20° C., dispersing the cellulose ester solution in water in the presence of a polar, surface-active emulsifying agent, which is preferentially soluble in the water and which does not increase substantially the viscosity of the water phase, to form an oil-in-water emulsion, removing the organic solvent from the dispersed cellulose ester particles by heating the emulsion with continued agitation at a maximum temperature of about 65° C., and separating the particles from the water.

2. A process for making small, substantially non-porous, substantially spherical particles of lower fatty acid esters of cellulose which comprises dissolving up to about 20% of the cellulose ester in an organic solvent comprising at least two solvent components, one of said components being insoluble to moderately soluble in water in an amount up to about 30% by weight at 20° C. and another of said components being infinitely soluble in water, said mixed solvent being soluble in water to the extent of about 10 to 50 parts per 100 parts of water at 20° C., dispersing the cellulose ester solution in water in the presence of a polar, surface-active emulsifying agent which is preferentially soluble in the water and which does not increase substantially the viscosity of the water phase, to form an oil-in-water emulsion, the water being in an amount comprising about 50 to 125% by volume based on the organic solvent, removing the organic solvent from the dispersed cellulose ester particles by heating the emulsion with continued agitation at a maximum temperature of about 65° C., and separating the particles from the water.

3. A process for making small, substantially non-porous, substantially spherical particles of lower fatty acid esters of cellulose which comprises dissolving about 5 to 20% of the cellulose ester in an organic solvent comprising at least two solvent components, one of said components being soluble to the extent of about 5 to 30 parts in 100 parts of water at 20° C. and another of said components being infinitely soluble in water, said mixed solvent being soluble in water to the extent of about 10 to 50 parts per 100 parts of water at 20° C., dispersing the cellulose ester solution in water in the presence of a polar, surface-active emulsifying agent which is preferentially soluble in the water and which does not increase substantially the viscosity of the water phase, to form an oil-in-water emulsion, the water being in amount comprising about 50 to 125% by volume based on the organic solvent, removing the organic solvent from the dispersed cellulose ester particles by heating the emulsion with continued agitation at a maximum temperature of about 50° C., and separating the particles from the water.

4. A process for making small, substantially non-porous, substantially spherical particles of lower fatty acid esters of cellulose which comprises dissolving about 5 to 20% of the cellulose ester in an organic solvent comprising at least two solvent components, one of said components being selected from the group consisting of methyl acetate and ethyl acetate and another of said components being selected from the group consisting of methanol and ethanol, said mixed solvent being soluble in water to the extent of about 10 to 40 parts per 100 parts of water at 20° C., dispersing the cellulose ester solution in water in the presence of a polar, surface-active emulsifying agent which is preferentially soluble in the water and which does not increase substantially the viscosity of the water phase, to form an oil-in-water emulsion, the water being in an amount comprising about 50 to 125% by volume based on the organic solvent, removing the organic solvent from the dispersed cellulose ester particles by heating the emulsion with continued agitation at a maximum temperature of about 50° C., and separating the particles from the water.

5. The process of claim 4 in which the cellulose ester is cellulose acetate and the emulsifying agent is a sulfonated oil.

6. The process of claim 5 in which the sulfonated oil is sulfonated castor oil.

7. A process for making small, substantially non-porous, substantially spherical particles of lower fatty acid esters of cellulose which comprises dissolving about 5 to 20% of the cellulose ester in an organic solvent comprising ethyl acetate and ethanol, the mixed solvent being soluble in water to the extent of about 10 to 40 parts per 100 parts of water at 20° C., dispersing the cellulose ester solution in water in the presence of a polar surface-active emulsifying agent which is preferentially soluble in the water and which does not increase substantially the viscosity of the water phase, to form an oil-in-water emulsion, the water being present in an amount comprising about 50 to 125% by volume based on the organic solvent, removing the organic solvent from the dispersed cellulose ester particles by heating the emulsion with continued agitation at a maximum temperature of about 50° C., and separating the particles from the water.

8. The process of claim 7 in which the emulsifying agent is a sulfonated oil.

9. The process of claim 7 in which the cellulose ester is cellulose acetate the ratio of ethyl acetate to ethanol is about 80:20 by volume and the emulsifying agent is sulfonated castor oil.

10. The process of claim 7 in which the cellulose ester is cellulose acetate.

11. The process of claim 7 in which the cellulose ester is cellulose acetate sorbate.

12. A process for making small, substantially non-porous, substantially spherical particles of lower fatty acid esters of cellulose which comprises dissolving up to about 20% of the cellulose ester in an organic solvent which is moderately soluble in water to the extent of about 10 to 50 parts in 100 parts of water at 20° C., any component of said solvent having a minimum water solubility of at least about 5 parts, dispersing the cellulose ester solution in water in the presence of a polar, surface-active emulsifying agent, which is preferentially soluble in the water and which does not increase substantially the viscosity of the water phase, to form an oil-in-water emulsion, the water being in an amount comprising about 50 to 125% by volume of the organic solvent, removing the organic solvent from the dispersed cellulose ester particles by heating the emulsion with continued agitation at a maximum temperature of about 65° C., and separating the particles from the water.

13. The process of claim 12 in which the cellulose ester is cellulose acetate.

14. A process for making small, substantially non-porous, substantially spherical particles of lower fatty acid esters of cellulose which comprises dissolving up to about 20% of the cellulose ester in an organic solvent which is moderately soluble in water to the extent of about 10 to 50 parts in 100 parts of water at 20° C., any component of said solvent having a minimum water solubility of at least about 5 parts, dispersing the cellulose ester solution in water in the presence of a polar, surface-active emulsifying agent, which is preferentially soluble in the water and which does not increase substantially the viscosity of the water phase, to form an oil-in-water emulsion, removing the organic solvent from the dispersed cellulose ester particles by diluting the emulsion with sufficient water substantially completely to dissolve the organic solvent out of the dispersed cellulose ester particles, and separating the particles from the water.

15. The process of claim 14 in which the water employed in making the oil-in-water emulsion is in an amount comprising about 50 to 125% by volume of the organic solvent.

16. The process of claim 15 in which the cellulose ester is cellulose acetate.

17. The process of claim 2 in which the cellulose ester is cellulose acetate.

18. The process of claim 3 in which the cellulose ester is cellulose acetate.

19. A process for making small, substantially non-porous, substantially spherical particles of lower fatty acid esters of cellulose which comprises dissolving about 5 to 20% of a cellulose ester in an organic solvent comprising at least two solvent components, one of said components being soluble to the extent of about 5 to 30 parts in 100 parts of water at 20° C. and another of said components being infinitely soluble in water, any component of said solvent having a minimum water solubility of at least about 5 parts, said mixed solvent being soluble in water to the extent of about 10 to 50 parts per 100 parts of water at 20° C., dispersing the cellulose ester solution in water in the presence of a polar, surface-active emulsifying agent which is preferentially soluble in water and which does not increase substantially the viscosity of the water phase, to form an oil-in-water emulsion, the water being in amount comprising about 50 to 125% by volume of the organic solvent, removing the organic solvent from the dispersed cellulose ester particles by diluting the emulsion with sufficient water substantially completely to dissolve the organic solvent out of the dispersed cellulose ester particles, and separating the particles from the water.

20. The process of claim 19 in which the cellulose ester is cellulose acetate.

21. The process of claim 4 in which the cellulose ester is cellulose acetate.

22. A process for making small, substantially non-porous, substantially spherical particles of lower fatty acid esters of cellulose which comprises dissolving about 5 to 20% of the cellulose ester in an organic solvent comprising at least two solvent components, one of said components being selected from the group consisting of methyl acetate and ethyl acetate and another of said components being selected from the group consisting of methanol and ethanol, said mixed solvent being soluble in water to the extent of about 10 to 40 parts per 100 parts of water at 20° C., dispersing the cellulose ester solution in water in the presence of a polar, surface-active emulsifying agent which is preferentially soluble in the water and which does not increase substantially the viscosity of the water phase, to form an oil-in-water emulsion, the water being in an amount comprising about 50 to 125% by volume based on the organic solvent, removing the organic solvent from the dispersed cellulose ester particles by diluting the emulsion with sufficient water substantially completely to dissolve the organic solvent out of the dispersed cellulose ester particles, and separating the particles from the water.

23. The process of claim 22 in which the cellulose ester is cellulose acetate.

24. The process of claim 23 in which the emulsifying agent is a sulfonated oil.

25. A process for making small, substantially non-porous, substantially spherical particles of lower fatty acid esters of cellulose which comprises dissolving about 5 to 20% of the cellulose ester in an organic solvent comprising ethyl acetate and ethanol, the mixed solvent being soluble in water to the extent of about 10 to 40 parts per 100 parts of water at 20° C., dispersing the cellulose ester solution in water in the presence of a polar, surface-active emulsifying agent which is preferentially soluble in the water and which does not increase substantially the viscosity of the water phase, to form an oil-in-water emulsion, the water being present in an amount comprising about 50 to 125% by volume based on the organic solvent, removing the organic solvent from the dispersed cellulose ester particles by diluting the emulsion with sufficient water substantially completely to dissolve the organic solvent out of the dispersed cellulose ester particles, and separating the particles from the water.

26. The process of claim 25 in which the cellulose ester is cellulose acetate, the ratio of ethyl acetate to ethanol is about 80:20 by volume and the emulsifying agent is a sulfonated oil.

27. The process of claim 25 in which the cellulose ester is cellulose acetate.

28. The process of claim 1 in which the cellulose ester is cellulose acetate sorbate.

29. The process of claim 14 in which the cellulose ester is cellulose acetate sorbate.

References Cited in the file of this patent

UNITED STATES PATENTS

| | | |
|---|---|---|
| 1,870,864 | Pratt et al. | Aug. 8, 1932 |
| 2,072,270 | Martin | Mar. 2, 1937 |
| 2,272,152 | Moore | Feb. 3, 1942 |
| 2,489,128 | Fox et al. | Nov. 22, 1949 |